United States Patent [19]
Nagata et al.

[11] 3,932,342
[45] Jan. 13, 1976

[54] METHYL METHACRYLATE LACQUERS CONTAINING POLYISOCYANATES

[75] Inventors: Nobuyoshi Nagata, Nara; Ryuzo Mizuguchi, Osaka, both of Japan

[73] Assignee: Nippon Paint Co., Ltd., Osaka, Japan

[22] Filed: Sept. 18, 1973

[21] Appl. No.: 398,370

Related U.S. Application Data

[63] Continuation of Ser. No. 199,020, Nov. 15, 1971, abandoned, which is a continuation of Ser. No. 689,764, Dec. 2, 1967, abandoned.

[30] Foreign Application Priority Data
Dec. 14, 1966 Japan.............................. 41-81548

[52] U.S. Cl...... 260/37 N; 260/23 EP; 260/77.5 AP
[51] Int. Cl.²......................................... C08G 18/06
[58] Field of Search........ 260/77.5 AP, 23 EP, 37 N

[56] References Cited
UNITED STATES PATENTS
3,028,367  4/1962  O'Brien.............................. 260/77.5
3,245,941  4/1966  Mayer et al.................... 260/31.6

*Primary Examiner*—Donald E. Czaja
*Assistant Examiner*—S. M. Person
*Attorney, Agent, or Firm*—Browne, Beveridge, DeGrandi & Kline

[57] ABSTRACT

This invention relates to a technique for improving the properties of the so-called methyl methacrylate lacquers prepared from polymers containing methyl methacrylate as a main monomer.

That is, a liquid coating composition, which contains as a main component a polymer obtained by polymerization of methyl methacrylate alone or of a monomer mixture comprising 60 – 98 % by weight of methyl methacrylate and 2 – 40 % by weight of other monomer copolymerizable therewith, is ordinarily called as a methyl methacrylate lacquer.

20 Claims, No Drawings

METHYL METHACRYLATE LACQUERS CONTAINING POLYISOCYANATES

This is a continuation, of application Ser. No. 199,020, filed Nov. 15, 1971, now abandoned; which is a Continuation of application, Ser. No. 689,764, filed Dec. 2, 1967 now abandoned, which applications are relied upon and the entire disclosure and specifications of which are hereby incorporated by reference.

The present invention pertains to a two-pack type polyurethane coating composition comprising a composition obtained by copolymerizing 50 – 95 parts by weight of a monomer mixture composed mainly of methyl methacrylate, which gives said methyl methacrylate lacquer, with 5 – 50 parts by weight of a polymerizable monomer having at least one hydroxyl group in a molecule, e.g. 2-hydroxyethyl methacrylate, to obtain a copolymer, and then combining a polyisocyanate compound with said copolymer.

A film formed from such composition has overcome the drawbacks of methyl methacrylate lacquer in impact resistance, adhesiveness, solvent resistance and crack resistance, and is excellent in weather resistance, durability, water resistance, chemical resistance and gloss.

A liquid coating compostion containing a polymer composed mainly of methyl methacrylate.

Generally, films of the so-called methyl methacrylate lacquers prepared from polymers containing methyl methacrylate as a main monomer have excellent characteristics in such properties as colorlessness, transparency, gloss retention over a long period and resistance to yellowing.

However, when formed into a film, a methyl methacrylate lacquer obtained by polymerizing methyl methacrylate alone or in combination with a small amount of an acrylate of $C_2 - C_{16}$ alkanol, e.g. ethyl acrylate, n-butyl acrylate or 2-ethylhexyl acrylate, or a methacrylate of $C_4 - C_{16}$ alkanol, e.g. 2-ethylhexyl methacrylate or lauryl methacrylate (these monomers are so-called internal-plasticizing monomers), tends to form cracks in the film by swelling or shrinking action due to temperature variation or to moisture, and encounters difficulties in impact resistance and in adhesion onto coated substrate surface. Further, this kind of lacquer is liable to cause shrinking or cracking phenomenon when recoated onto its own film or overcoated onto other films. That is, the lacquer is inferior in recoating and overcoating.

In case the amounts of said plasticizable monomers are increased, the above drawbacks can be overcome to a considerable extent, but the resulting film becomes soft, and not only it becomes high in temperature susceptibility and thermoplastic tendency but also it is deteriorated in gasoline resistance and water resistance.

Even in the case of a methyl methacrylate lacquer in which an internal-plasticizing monomer has been used in such a suitable amount as to satisfy, from the standpoint of its composition, the hardness, gasoline resistance and crack resistance of the resulting film and such proportion as recoating and the like, these properties are not satisfactory, in practice, unless the molecular weight of the polymer employed is made higher than a definite limit. However, the molecular weight of a copolymer obtained by solution polymerization is closely connected with the viscosity of the copolymer solution, and therefore such methyl methacrylate lacquer cannot be applied, in general, unless it is diluted, before application, with a large amount of solvent. This indicates the fact that such a methyl methacrylate lacquer as mentioned above is not well retained on a substrate to be coated, cannot be applied thickly by one time application and tends to cause wobbing particularly in spray coating.

In accordance with the present invention, a copolymer is obtained by copolymerizing a polymerizable monomer capable of forming a methyl methacrylate lacquer with another polymerizable monomer having at least one hydroxyl group in a molecule, and the copolymer chains are cross-linked, in a film state, by means of a polyisocyanate compound to obtain a coating composition which is excellent not only in such mechanical properties of the resulting film as hardness, impact resistance, flexibility and adhesiveness but also in workability, weather resistance, chemical resistance, crack resistance, solvent resistance, gloss and coated surface state.

The copolymer useful for the production of the present coating composition is obtained by copolymerizing 60 – 95 parts by weight of a methyl methacrylate monomer, or of a monomer mixture comprising 60 – 98 % by weight of methyl methacrylate and 2 – 40 % by weight of other monomer copolymerizable therewith, with 5 – 40 parts by weight of a polymerizable monomer having at least one hydroxyl group in a molecule. To this copolymer, at least one polyisocyanate compound having at least 2 isocyanate groups in a molecule is added so that the amount of isocyanate groups becomes 0.2 – 5.0 equivalents based on the hydroxyl group in the copolymer, whereby the vehicle of the present two-pack type coating composition is obtained.

In the present invention, the monomers capable of being copolymerized with methyl methacrylate within the range of 2 – 40 % by weight include acrylates of $C_1 - C_{16}$ alkanol, methacrylates of $C_2 - C_{16}$ alkanol, styrene, vinyltoluene, α-methylstyrene, acrylonitrile, methacrylonitrile, vinyl formate, vinyl acetate, vinyl butyrate, vinyl stearate, methyl vinyl ether and ethyl vinyl ether. These monomers are preferably used, in the case of the present invention, in an amount up to 40 % by weight based on the amount of methyl methacrylate. If the amount is more than said limit, the characteristics of methyl methacrylate are lost. In addition to such relatively neutral monomers as mentioned above, there may be copolymerized, in order to increase the wettability of pigments and copolymers, a small amount of acrylic acid, methacrylic acid, crotonic acid, itaconic acid, maleic acid, fumaric acid, acrylamide or methacrylamide. Further, in order to promote the cross-linking reaction of isocyanate groups with hydroxyl groups, there may be copolymerized a small amount of a monomer having a tertiary amino group such as, for example, N,N'-dimethylamino ethylmethacrylate or N,N'-diethylamino ethylmethacrylate.

The polymerizable monomers having at least one hydroxyl group in a molecule which are used in the present invention include 2-hydroxyethyl acrylate, 2-hydroxypropyl acrylate, 2-hydroxybutyl acrylate, 2-hydroxyethyl methacrylate, 2-hydroxypropyl methacrylate, 2-hydroxybutyl methacrylate, N-methylol acrylamide, N-methylol methacrylamide, allyl alcohol, methallyl alcohol and crotyl alcohol. If the amount of the polymerizable monomer having a hydroxyl group is less than 5 parts by weight based on the total monomer, cross-linking density becomes too low to form a film having desired properties, whereas if the amount is more than 50 parts by weight, the merits of the resulting methyl methacrylate lacquer become not marked.

What is particularly interesting in the above case is that in case a markedly flat and smooth film is desired to be obtained by use of the present coating composition, it is preferable to introduce into the copolymer a component obtained by the 1 : 1 addition reaction of a terminal epoxy compound having one polymerizable unsaturated group and a fatty acid. By the 1 : 1 addition reaction of terminal epoxy group and carboxyl group, one hydroxyl group is formed.

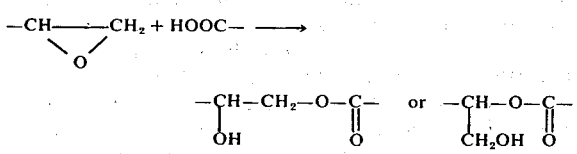

The thus obtained addition reaction product is used as the polymerizable unsaturated monomer having at least one hydroxyl group in a molecule. In this case, a side chain due to the long carbon-carbon bond of fatty acid component is introduced into the copolymer, so that the coating composition is lowered in surface tension to readily form a particularly smooth film. The above addition reaction may be effected either before, during or after the copolymerization reaction for preparation of the copolymer. The terminal epoxy compounds having polymerizable unsaturated groups which are used in the above system include glycidyl acrylate, glycidyl methacrylate and allyl glycidyl ether, and the fatty acids include linseed oil fatty acid, sardine oil fatty acid, tung oil fatty acid, dehydrated castor oil fatty acid, safflower oil fatty acid, soybean oil fatty acid, whale oil fatty acid, rice bran oil fatty acid, cottonseed oil fatty acid, castor oil fatty acid and coconut oil fatty acid. The addition reaction of the carboxyl group of fatty acid and the epoxy group of epoxy compound is effected at a temperature of 100°– 180°C. Further, the addition reaction may be carried out in the presence of a slight amount of a Lewis base catalyst much as tertiary amine.

As the type of polymerization reaction for the preparation of copolymers having such compositions and characteristics as mentioned above, there may be adopted any of the conventional methods for the polymerization of methyl methacrylate. Preferably, the polymerization is effected in a solution at a temperature of 70°– 180°C. in the presence of a polymerization initiator such as peroxides or azo compounds.

The thus obtained copolymers having methyl methacrylate as main component and hydroxyl groups as pendant groups are then cross-linked by means of polyisocyanate compounds. As these polyisocyanate compounds, there are used aliphatic and alicyclic diisocyanates such as hexamethylene diisocyanate, 2,4-diisocyanate-1-methylcyclohexane, diisocyanate cyclobutane, tetramethylene diisocyanate, o-, m- and p-xylylene diisocyanates, dicyclohexylmethane diisocyanate and dimethyldicyclohexylmethane diisocyanate, and aromatic polyisocyanates such as tolylene-2,4-diisocyanate, tolylene-2,6-diisocyanate, diphenylmethane-4,4'-diisocyanate, 3-methyldiphenylmethane-4,4'-diisocyanate, m- and p-phenylene diisocyanates, chlorophenylene-2,4-diisocyanate, naphthalene-1,5-diisocyanate, diphenyl-4,4'-diisocyanate-3,3'-dimethyldiphenyl, 1,3,5-triisopropyl-2,41-diisocyanate and diphenylether diisocyanate, and mixtures thereof. Further, there are used polyurethane-polyisocyanate compounds obtained by reacting excess of the above-mentioned polyisocyanate compounds with polyhydroxy compounds such as ethylene glycol, diethylene glycol, neopentyl glycol, trimethylolethane trimethylolpropane, glycerine and hexanetriol. In addition, isocyanurate group-containing polyisocyanate compounds, allophanate group-containing polyisocyanate compounds and biuret group-containing polyisocyanate compounds are also usable. In some cases, polyisocyanate compounds derived from dimer acids may also be employed.

These polyisocyanate compounds are used in such an amount that the amount of isocyanate group becomes 0.2 – 5.0 equivalents based on the hydroxyl group in the copolymer. If the amount is less than said range, no sufficient effect of cross-linking can be attained, while an amount more than said range is not necessary for the present coating composition.

Solvents to be used in the preparation of the present copolymers and in the production and application of the present coating compositions are those which are not reactive with isocyanate groups. These include, for example, aliphatic hydrocarbons, alicyclic hydrocarbons, aromatic hydrocarbons, halogenated hydrocarbons, ethers, esters, ketones and nitriles. Concretely, benzene, toluene, xylene, solvent naphthas, dioxane, acetene, acetonitrile, methyl ethyl ketone, methyl isobutyl ketone, diisopropyl ketone, ethyl acetate, propyl acetate, butyl acetate, ethylene glycol monoethylether acetate, diethylene glycol monoethylether acetate and 3-methoxybutyl acetate are frequently employed.

The present coating compositions are colored by addition of pigments, except the cases where clear films are desired to be obtained. Examples of such pigments are oxides, hydroxides, silicates, chromates, sulfides, sulfates and carbonates of metals, various organic pigments, carbon black and metal flake pigments. The amount of pigment to be used is greatly affected by the kind of pigment but is preferably up to 300 parts by weight per 100 parts by weight of resin solid.

The amount of solvent to be incorporated at the time of application of the coating composition varies depending on the manner of application, but is preferably such that the weight ratio of resin solid to solvent is from 60 : 40 to 10 : 90.

The present coating compositions can be applied to materials to be coated either by spray coating, brush coating, dip coating or roller coating. The resulting films may be allowed to dry and cure at room temperature, or may be dried and cured by heating at temperatures below 150°C. The curing rate at the time of drying may be accelerated by use of a compound known as a catalyst such as, for example, dibutyltin dilaurate, stannous caprylate or dimethylbenzylamine.

As suitable materials to be coated with the present coating compositions, there are metals, wood, rubbers, glass, fibers, leathers and various polymer materials.

The present invention will be illustrated in detail below with reference to examples.

The starting material compositions of individual examples and testing data of the resulting resin solutions were as set forth in Table 1. Polmerization, in the case of Example 1, for instance, was effected in the following manner:

Given amounts of methyl methacrylate, 2-hydroxyethyl methacrylate, lauryl mercaptan as a chain transfer agent, xylene, ethyl acetate, butyl acetate and ethylene glycol monoethylether acetate were charged into a reactor, and the reaction system was flushed with nitrogen gas, if necessary. The reaction system was brought into a reflux state with stirring, and a solution of the polymerization initiator azobisisobutyronitrile in a solvent (toluene) bearing the mark * was added dropwise over a period of 2 hours to the reaction system in the above-mentioned state to effect polymerization reaction. After completion of the dropwise addition, the reaction system was heated and refluxed with stirring for additional 2 hours. The testing data of the resulting resin solution were measured according to ordinary methods.

| Xylene | 159.00 parts |
| Hydroquinone | 0.23 parts |

The above materials were charged into a reactor. After flushing the reaction system with nitrogen gas, the temperature was elevated to 140°C. with stirring. Subsequently, the addition reaction of the carboxyl group of dehydrated castor fatty acid with the epoxy group of glycidyl methacrylate was traced while estimating the amount of carboxyl group left in the system. This addition reaction is a considerably exothermic reaction, and the xylene was added in order to prevent the system from the sudden increase in temperature while the radical inhibitor hydroquinone was added so that no polymerization reaction takes place at this Table 1.

| | Example No. | 2 | 3 | 4 | 5 | 6 | 7 |
|---|---|---|---|---|---|---|---|
| | Methylmethacrylate | 85 | 81 | 72 | 82 | 63 | 81 |
| | Ethyl acrylate | — | 9 | — | — | — | — |
| | n-Butyl acrylate | 10 | — | 18 | 8 | 27 | — |
| | Lauryl methacrylate | — | — | — | — | — | — |
| | 2-Ethylhexyl acrylate | — | — | — | — | — | 9 |
| | 2-Hydroxyethyl methacrylate | 5 | 10 | — | — | 10 | 10 |
| Starting material composition (parts by weight) | 2-Hydroxypropyl methacrylate | — | — | 10 | — | — | — |
| | N-Methylol acrylamide | — | — | — | 10 | — | — |
| | Fatty acid-epoxy compound addition product | — | — | — | — | — | — |
| | Lauryl mercaptan | 0.6 | 0.7 | 0.5 | 1.5 | 0.5 | 0.6 |
| | Toluene | 30* | 30* | 30* | 30* | 30* | 30* |
| | Xylene | 10 | 20 | 10 | — | 30 | 10 |
| | Ethyl acetate | 30 | 30 | 30 | 30 | 30 | 30 |
| | Butyl acetate | 20 | 10 | 20 | 30 | — | 20 |
| | Ethylene glycol monoethyl-ether acetate | 10 | 10 | 10 | 10 | 10 | 10 |
| | Methyl isobutyl ketone | — | — | — | — | — | — |
| | Acetonitrile | — | — | — | — | — | — |
| | Azobisisobutyronitrile | 1.2 | 1.0 | 1.2 | 1.5 | 1.2 | 1.2 |
| | Non-volatile (W %) | 50 | 52 | 52 | 52 | 52 | 51 |
| Testing data | Viscosity (Gardner-Holtz) | $Z_4$-$Z_5$ | $Z_6$ | $Z_4$-$Z_5$ | $Z_6$ | $Z_5$ | $Z_6$ |
| | Amount of hydroxyl group in resin solution (W %) | 0.327 | 0.654 | 0.590 | 0.842 | 0.654 | 0.654 |

| | Example No. | 8 | 9 | 10 | 12 | 13 |
|---|---|---|---|---|---|---|
| | Methylmethacrylate | 76.5 | 85 | 56 | 66 | 60 |
| | Ethyl acrylate | — | — | — | — | — |
| | n-Butyl acrylate | 8.5 | — | 24 | — | — |
| | Lauryl methacrylate | — | — | — | 4 | — |
| | 2-Ethylhexyl acrylate | — | — | — | — | — |
| | 2-Hydroxyethyl methacrylate | 15 | 15 | 20 | — | — |
| Starting material composition (parts by weight) | 2-Hydroxypropyl methacrylate | — | — | — | — | — |
| | N-Methylol acrylamide | — | — | — | — | — |
| | Fatty acid-epoxy compound addition product | — | — | — | 30[a)] | 40[b)] |
| | Lauryl mercaptan | 0.5 | 2.0 | 0.5 | 1.4 | 1.4 |
| | Toluene | 30* | 30* | 30* | 30* 20 | — |
| | Xylene | 10 | — | — | 50 | 40 |
| | Ethyl acetate | 30 | 30 | — | — | 20* |
| | Butyl acetate | 20 | 30 | 15 | — | 40 |
| | Ethylene glycol monoethyl-ether acetate | 10 | 10 | 10 | — | — |
| | Methyl isobutyl ketone | — | — | 15 | — | — |
| | Acetonitrile | — | — | 30 | — | — |
| | Azobisisobutyronitrile | 1.2 | 1.2 | 1.2 | 1.2 | 1.4 |
| | Non-volatile (W %) | 52 | 52 | 52 | 50 | 50 |
| Testing data | Viscosity (Gardner-Holtz) | $Z_6$< | $Z_4$ | $Z_2$ | Y-Z | Q |
| | Amount of hydroxyl group in resin solution (W %) | 0.983 | 0.983 | 1.307 | 0.606 | 0.824 |

Note:

a. The fatty acid-epoxy compound addition product which was used in Example 12 was prepared in the following manner:

| Dehydrated castor oil fatty acid | 420.00 parts |
| Glycidyl methacrylate | 224.00 parts |
| N,N'-Diethylamino ethyl methacrylate | 1.50 parts | stage. Further, the N,N'-diethylamino ethyl methacrylate was used at this stage as a catalyst for the addition reaction of epoxy group with carboxyl group. After 4 hours, the acid number was reduced by about 100 %. The product of the above addition reaction is sometimes used after isolation and purification but, in the case of the present invention, the product is not required to be isolated. The amount (30 parts by weight)

of the addition product in the composition is of course the amount of only the addition product.

b. The fatty acid-epoxy compound addition product which was used in Example 13 was prepared in the following manner:

| | |
|---|---|
| Rice bran oil fatty acid | 200.00 parts |
| Glycidyl methacrylate | 115.00 parts |
| Xylene | 79.00 parts |
| Hydroquinone | 0.06 parts |

The above materials were charged into a reactor, and addition reaction was effected according to the same procedures as in the case of a). After 5 hours, the acid number was reduced by 98 %. The amount (40 parts of weight) of the addition product in the composition is of course the amount of only the addition product.

The amount of solvent bearing the mark * shows the amount and kind of the solvent which was used to dissolve azobisisobutyronitrile and was added dropwise.

A clear film of the resin solution prepared according to individual examples set forth in Table 1 is obtained in the following manner:

To the solution, a polyisocyanate compound is added so that the amount thereof becomes 0.2 – 5.0 equivalents based on the hydroxyl group contained in the resin solution. After thorough stirring, the mixture is diluted to a viscosity suitable for application and is then applied to a material to be coated to obtain a clear film.

Further, a colored film of each resin solution is obtained in the following manner:

The resin solution is charged with a pigment and, if necessary, with a small amount of an antifoating agent or the like, and the pigment is dispersed by use of an ordinary dispersing means to prepare an enamel. To the enamel, a polyisocyanate compound is added so that the amount of isocyanate group becomes 0.2 – 5.0 equivalents based on the hydroxyl group of the resin contained in the enamel. After thorough stirring, the mixture is diluted to a viscosity suitable for application and is then applied to a material to be coated to obtain a colored film.

The proportion of the films of coating compositions using the copolymers obtained in the above examples were as shown in Table 2, in which the aluminum leafing type pigment employed was "Alpaste 1109 A" (a product of Toyo Aluminum K. K.), the coloring pigment was "Microlith 4GT Blue" (in product of Ciba Ltd.), the titanium dioxide was "Rutile Type Titanium Oxide R-820" (a product of Ishihara Sangyo K. K.), and the polyisocyanate compound was "Dosmodur N-75" (a product of Bayer).

The properties of the films of the thus obtained coating compositions were tested according to the following procedures:

Each of the coating compositions was diluted with solvents to a suitable viscosity, was applied onto a 0.8 mm. thick steel plate coated with an expoxy resin-modified acrylic primer, and was dried and cured at room temperature for 7 days or at 80°C. for 20 minutes. The thickness of the dried film was so controlled that the thickness of the primer became about 40 microns and that of the film of the present coating composition became 40 – 50 microns.

The glass of the resulting film was measured from a value at an angle of 60° of Murakami's glass meter. The hardness of the film was measured from a pencil hardness value and was represented by a scratch-free maximum grade hardness. The impact strength was measured by means of a Du Pont's impact tester using a stand of ½ inch in diameter and a weight of 500 g. The adhesiveness was measured in such a manner that by use of a needle, 100 squares of 2 mm. in side were marked on the film, and an adhesive tape was attached onto the squares and was then vigorously peeled off. If no square had come off, the film was decided to be "passed". The gasoline resistance was measured in such a manner that the film was immersed in a commercially available loaded colored gasoline at room temperature for 24 hours, was taken out and, after 30 minutes, was observed to investigate whether or not there was any such change as glass reduction or coloration. After 4 hours, the pencil hardness of the film was measured to investigate the hardness retention thereof. The hot water resistance of the film was tested by immersing in city water at 40°C. for 240 hours. The ultraviolet ray resistance of the film was measured by using two 15 W ultraviolet sterilization lamps having a main wave length of 253.7 m$\mu$ which had been arranged side by side, allowing the film to stand for 100 hours at a distance of 30 cm. from the lamps, and evaluating the resistance from the observation after irradiation (whether or not there was any yellowing or chalking) and from the value given by a glassmeter at an angle of 60°. The thus obtained properties of films of the present coating compositions are shown in Table 2 together with the blended additives.

Table 2

| | Example No. | 1 | 2 | | 3 | 4 | 5 | | 6 |
|---|---|---|---|---|---|---|---|---|---|
| Blended Additives (part by weight) | Resin solution | 200 | 200 | 200 | 200 | 200 | 200 | 200 | 200 | 200 |
| | Rutile type titanium di-oxide | — | 40 | — | 40 | — | — | 40 | — | — |
| | Aluminum leafing type pigment | 4 | — | 4 | — | 4 | — | — | 4 | — |
| | Blue coloring agent | 3 | — | 3 | — | 3 | — | — | 3 | — |
| | Desmodur N - 75 | 11 | 11 | 11 | 22 | 22 | 20 | 28 | 28 | 22 |
| Film efficiencies | Value of glossmeter | 93 | 92 | 93 | 91 | 91 | 96 | 86 | 88 | 95 |
| | Pencil hardness | 2H | 2H | 2H | 2H | H | 3H | H | H | H |
| | Impact strength (cm) | 25 | 30 | 40 | 30 | 40 | 20 | 30 | 30 | 30 |
| | Adhesiveness test | do | do | do | do | do | do | do | do | do |
| | Gasoline resistance Observation | do | do | Substantially unchanged | unchanged | do | do | do | do | do |
| | Hardness retention | 2H | HB | B | 2H | H | H | H | H | 2B |
| | Hot water resistance | do | do | do | do | do | do | do | do | do |
| | Ultraviolet resistance Observation | do | do | do | do | do | — | Excellent | do | — |
| | value of glossmeter | 80 | 80 | 85 | 81 | 80 | — | 82 | 80 | — |

| | Example No. | 7 | 8 | 9 | 10 | 12 | 13 | | |
|---|---|---|---|---|---|---|---|---|---|
| Blended | Resin solution | 200 | 200 | 200 | 200 | 200 | 200 | 200 | 200 |

Table 2-continued

| | Example No. | 1 | 2 | 3 | 4 | 5 | 6 | 7 | 8 | 9 |
|---|---|---|---|---|---|---|---|---|---|---|
| Additives (part by weight) | Rutile type titanium di-oxide | 40 | — | 40 | — | 40 | — | — | 50 | 50 |
| | Aluminum leafing type pigment | — | 4 | — | 4 | — | 4 | — | — | — |
| | Blue coloring agent | — | 3 | — | 3 | — | 3 | — | — | — |
| | Desmodur N - 75 | 22 | 33 | 22 | 33 | 33 | 33 | 43 | 28 | 27 |
| Film efficiencies | Value of glossmeter | 90 | 93 | 80 | 81 | 93 | 90 | 80 | 92 | 94 |
| | Pencil Hardness | 3H | 2H | H | 2H | H | H | H | H | 2H |
| | Impact strength (cm) | 25 | 35 | 30 | 25 | 30 | 40 | 30 | 50 | 30 |
| | Adhesiveness test Observation | do | do | do | do | do | do | do | do | do |
| | | do | do | do | do | do | do | do | do | do |
| | Gasoline resistance Hardness retention | H | B | H | 2H | H | H | HB | H | H |
| | Hot water resistance | do | do | do | do | do | do | do | do | do |
| | Observation | Excellent | do | do | do | do | do | — | Excellent | do |
| | Ultraviolet resistance value of glossmeter | 80 | 90 | 73 | 76 | 90 | 85 | — | 88 | 86 |

What we claim is:

1. A coating composition comprising a solvent incapable of reacting with an isocyanate group and film-forming ingredients consisting of (A) a copolymer obtained by copolymerizing 85 to 90 parts by weight of methyl methacrylate with 10 to 15 parts by weight of a polymerizable monomer having at least one hydroxyl group in themmolecule selected from the group consisting of 2-hydroxalkyl acrylates, 2-hydroxyalkyl methacrylates, N-methylol acrylamide, N-methylol methacrylamide, allyl alcohol, methallyl alcohol and crotyl alcohol, the total amount of the two being 100 parts by weight and (B) at least one polyisocyanate compound having at least two isocyanate groups in the molecule added to said copolymer in an amount of 0.2 to 5.0 equivalents to the hydroxyl groups of said copolymer.

2. A coating composition according to claim 1, wherein the polymerizable monomer having at least one hydroxyl group in the molecule is 2-hydroxyethyl methacrylate.

3. A coating composition according to claim 1, wherein the polymerizable monomer having at least one hydroxyl group in the molecule is N-methylol acrylamide.

4. A coating composition according to claim 1, wherein up to 5% by weight of the total constituents of the copolymer is a tertiary amino group-containing monomer unit.

5. A coating composition according to claim 1, wherein the composition further contains a pigment in an amount of 1 to 300 party by weight per 100 parts by weight of the resin solid.

6. A coating composition according to claim 5, wherein 1 to 5 parts by weight of an aluminum flake pigment and 1 to 5 parts by weight of a colored disperse pigment paste are uniformly dispersed in the copolymer solution per 100 parts by weight of the film-forming ingredients.

7. A coating composition according to claim 1 wherein said copolymer is obtained by copolymerizing 63 parts by weight of methyl methacrylate, 27 parts by weight of n-butyl acrylate and 10 parts by weight of 2-hydroxyethyl methacrylate.

8. A coating composition comprising a solvent incapable of reacting with an isocyanate group and film-forming ingredients consisting of (A) a copolymer obtained by copolymerizing 50 to 95 parts by weight of methyl methacrylate with 5 to 50 parts by weight of a member selected from the group consisting of a 1 : 1 adduct of a fatty acid and a glycidyl ester of an alpha, beta-ethylenically unsaturated acid and a mixture of said 1 : 1 adduct with another polymerizable monomer having at least one hydroxyl group in the molecule, the total amount of said monomers being 100 parts by weight, and (B) at least one polyisocyanate compound having at least two isocyanate groups in the molecule added to said copolymer in an amount of 0.2 to 5.0 equivalents to the hydroxyl groups of said copolymer.

9. A coating composition comprising a solvent incapable of reacting with an isocyanate group and film-forming ingredients consisting of (A) a copolymer obtained by copolymerizing 49 to 93 parts by weight of methyl methacrylate, 2 to 38 parts by weight of a polymerizalbe unsaturated monomer and 5 to 50 parts by weight of a member selected from the group consisting 1 : 1 adduct of a fatty acid and a glycidyl ester of an alpha, beta-ethylenically unsaturated acid and a mixture of said 1 : 1 adduct with another polymerizable monomer having at least one hydroxyl group in the molecule, the total amount of said monomers being 100 parts by weight, and (B) at least one polyisocyanate compound having at least one isocyanate group in the molecule added to said copolymer in an amount of 0.2 to 5.0 equivalents to the hydroxyl groups of said copolymer.

10. A coating composition comprising a solvent incapable of reacting with an isocyanate group and the film-forming ingredients consisting of (A) a copolymer obtained by copolymerizing 50 to 80.75 parts by weight of methyl methacrylate, 2.5 to 28.5 parts by weight of at least one member selected from the group consisting of styrene, vinyl toluene and alphamethylstyrene and 5 to 33.25 parts by weight of one member selected from the group consisting of at least acrylates of $C_1$-$C_{16}$ alkanols, methacrylates of $C_2$-$C_{16}$ alkanols, acrylonitrile, methacrylonitrile, vinyl formate, vinyl acetate, vinyl butyrate, vinyl stearate, methyl vinyl ether and ethyl vinyl ether with 5 to 42.5 parts by weight of a member selected from the group consisting of a 1 : 1 adduct of a fatty acid and a glycidyl ester of an alpha, beta-ethylenically unsaturated acid and a mixture of said 1 : 1 adduct with another polymerizable monomer having at least one hydroxyl group in the molecule, the total amount of said monomers being 100 parts by weight, and (B) at least one polyisocyanate compound having at least two isocyanate groups in the molecule added to said copolymer in an amount of 0.2 to 5.0 equivalents to the hydroxyl groups of said copolymer.

11. A coating composition according to claim 8, wherein up to 5% by weight of the total constituents of the copolymer is a tertiary amino group-containing monomer unit.

12. A coating composition according to claim 9, wherein up to 5% by weight of the total constituents of the copolymer is a tertiary amino group-containing monomer unit.

13. A coating composition according to claim 10, wherein up to 5% by weight of the total constituents of the copolymer is a tertiary amino group-containing conomer unit.

14. A coating composition according to claim 8, wherein the fatty acid is at least one member selected from the group consisting of dehydrated castor oil fatty acid, rice bran oil fatty acid and coconut oil fatty acid.

15. A coating composition according to claim 9, wherein the fatty acid is at least one member selected from the group consisting of dehydrated castor oil fatty acid, rice bran oil fatty acid and coconut oil fatty acid.

16. A coating composition according to claim 10, wherein the fatty acid is at least one member selected from the group consisting of dehydrated castor oil fatty acid, rice bran oil fatty acid and coconut oil fatty acid.

17. A coating composition according to claim 8, wherein the glycidyl ester of an alpha, beta-ethylenically unsaturated acid is at least one member selected from the group consisting of glycidyl methacrylate and glycidyl acrylate.

18. A coating composition according to claim 9, wherein the glycidyl ester of an alpha, beta-ethlenically unsaturated acid is at least one member selected from the group consisting of glycidyl methacrylate and glycidyl acrylate.

19. A coating composition according to claim 10, wherein the glycidyl ester of an alpha, beta-ethylenically unsaturated acid is at least one member selected from the group consisting of glycidyl methacrylate and glycidyl acrylate.

20. A coating composition comprising a solvent incapable of reacting with an isocyanate group and film-forming ingredients consisting of (A) a copolymer obtained by copolymerizing 85 parts by weight of methyl methacrylate monomer with 15 parts by weight of 2-hydroxyethyl methacrylate monomer; and (B) at least one polyisocyanate compound having at least two isocyanate groups in the molecule added to said copolymer in an amount of 0.2 to 5.0 equivalents to the hydroxyl groups of said copolymer.

* * * * *